(12) United States Patent
Watanabe (10) Patent No.: US 8,037,910 B2
(45) Date of Patent: Oct. 18, 2011

(54) PNEUMATIC TIRE

(75) Inventor: Noriyoshi Watanabe, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/755,896

(22) Filed: Apr. 7, 2010

(65) Prior Publication Data
US 2010/0263775 A1    Oct. 21, 2010

(30) Foreign Application Priority Data
Apr. 17, 2009    (JP) .................................. 2009-101423

(51) Int. Cl.
  *B60C 11/04* (2006.01)
  *B60C 11/12* (2006.01)

(52) U.S. Cl. .............. 152/209.8; 152/209.9; 152/209.27; 152/DIG. 3

(58) Field of Classification Search .............. 152/209.8, 152/209.9, 209.18, 209.27, DIG. 3
See application file for complete search history.

(56) References Cited

U.S. PATENT DOCUMENTS

| | | | | |
|---|---|---|---|---|
| 5,766,383 | A * | 6/1998 | Hasegawa et al. | 152/209.18 |
| 5,851,322 | A * | 12/1998 | Hayashi | 152/DIG. 3 |
| 7,484,543 | B2 * | 2/2009 | Colombo et al. | 152/209.8 |
| 2003/0019555 | A1 * | 1/2003 | Nakagawa | 152/DIG. 3 |
| 2003/0101851 | A1 * | 6/2003 | Domange et al. | 76/101.1 |
| 2007/0051448 | A1 * | 3/2007 | Yumii | 152/209.18 |
| 2008/0236714 | A1 * | 10/2008 | Kojima | 152/209.8 |
| 2009/0178745 | A1 * | 7/2009 | Ikegami | 152/209.8 |
| 2009/0272474 | A1 * | 11/2009 | Nagai et al. | 152/209.18 |

FOREIGN PATENT DOCUMENTS

| | | |
|---|---|---|
| AT | 400553 | 1/1996 |
| DE | 20216992 | 2/2003 |
| EP | 611667 | * 8/1994 |
| EP | 1695843 | * 8/2006 |
| JP | 62-103205 | * 5/1987 |
| JP | 11-208217 | 8/1999 |
| JP | 2000-238510 | 9/2000 |
| JP | 2006-076338 | 3/2006 |
| JP | 2006-347346 | * 12/2006 |
| JP | 2007-083810 | * 4/2007 |

(Continued)

OTHER PUBLICATIONS

Machine translation for Japan 2009-067173 (no date).*

(Continued)

*Primary Examiner* — Steven D Maki
(74) *Attorney, Agent, or Firm* — Thorpe North & Western LLP (57) ABSTRACT

A pneumatic tire is provided including a multiplicity of land portions 3A, 3B, 3C, 3D, and 3E formed by main grooves 2 extending linearly in the tire width direction partitioning the tread surface 1, and having a designated mounting direction on a vehicle. Among the multiplicity of land portions 3A, 3B, 3C, 3D, and 3E, lug grooves are not provided in a ground contact region R of the land portions 3A and 3E positioned on both shoulder sides. Lug grooves 4 inclining in the tire circumferential direction that have terminating parts in the land portions and opening to the main groove 2 on the vehicle inner side are formed at specified intervals in the tire circumferential direction in the land portions 3B and 3D inwardly adjacent to the land portions on both shoulder sides.

20 Claims, 4 Drawing Sheets

FOREIGN PATENT DOCUMENTS

| | | | |
|---|---|---|---|
| JP | 2007-168597 | | 7/2007 |
| JP | 2007-237816 | * | 9/2007 |
| JP | 2008-162390 | | 7/2008 |
| JP | 2008-195100 | * | 8/2008 |
| JP | 2009-067173 | * | 4/2009 |
| WO | WO2007/072824 | | 6/2007 |

OTHER PUBLICATIONS

Machine translation for Japan 2008-195100 (no date).*
Machine translation for Japan 2007-237816 (no date).*
Machine translation for Japan 2007-083810 (no date).*
Machine translation for Japan 2006-347346 (no date).*
Machine translation for Europe 611667 (no date).*

* cited by examiner

PNEUMATIC TIRE

PRIORITY CLAIM

This application is based upon and claims the benefit of priority from Japanese Patent Application No. 2009-101423, filed Apr. 17, 2009, the entire contents of which are incorporated herein by reference.

TECHNICAL FIELD

The present invention relates to a pneumatic tire, and more specifically relates to a pneumatic tire that improves noise performance while achieving a high level of both steering stability performance on dry road surfaces and steering stability performance on wet road surfaces.

BACKGROUND ART

In recent years, along with advances in road maintenance and enhanced performance of vehicles, improvement in noise performance while achieving a high level of both dry performance and wet performance when driving at high speeds has become strongly desired for pneumatic tires.

Guaranteeing drainage by forming, on a tread surface of tires, main grooves extending in a circumferential direction as well as lug grooves and sipes extending in a width direction is normally performed as a method for improving wet performance. However, there is a problem that it is difficult to guarantee steering stability on dry road surfaces by such a method since the rigidity of land portions formed on the tread surface decreases. Moreover, there is also a problem that this decrease in rigidity simultaneously results in the deterioration of noise performance.

Many conventional measures for improving noise performance while achieving a high level of performance in both dry performance and wet performance include specifying the shape and position of lug grooves after specifying a mounting direction of a tire on a vehicle have been proposed. However, among these proposals, some of the tires have a problem of insufficient running performance when turning on dry road surfaces since the lug grooves formed in the land portions are positioned in the ground contact region open to the main grooves on the vehicle outer side. These lug grooves formed in the land portions positioned in the ground contact region opening to the main grooves on the vehicle outer side also simultaneously cause the problem that it is difficult to control noise performance as a result of the emission of pattern noise to the vehicle outer side. Other tires have difficulty in suppressing the generation of pattern noise or the dispersion thereof to the outside since the lug grooves are provided in the land portions on both shoulders in the ground contact region. There is thus a problem that noise performance deteriorates.

SUMMARY OF THE INVENTION

The pneumatic tire of the present invention achieves the aforementioned objects by having a designated mounting direction on a vehicle, a plurality of main grooves that are provided on a tread surface and that extend linearly in a tire circumferential direction; and a multiplicity of land portions formed by the main grooves partitioning the tread surface; wherein among the multiplicity of land portions, lug grooves are not provided in a ground contact region of the land portions positioned on both shoulder sides, lug grooves inclining in the tire circumferential direction that have terminating parts in the land portions and opening to the main grooves on the vehicle inner side partitioning the tread surface into the land portions are formed at specified intervals in the tire circumferential direction in land portions adjacent to an inner side of the land portions on both shoulder sides, and a length of the lug grooves extending in the tire width direction is 40 to 60% of a width of the land portions in which the lug grooves are formed and an inclination angle on an acute angle side of the lug grooves with respect to the tire circumferential direction for the land portions on the vehicle outer side is equal to or less than that of the land portions on a vehicle inner side.

Also, the aforementioned configuration is preferably constituted as disclosed in (1) and/or (2) below.
(1) The width of the land portions in which the lug grooves are formed is larger in the land portions on the vehicle outer side than in the land portions on the vehicle inner side.
(2) Sipes extending in the tire width direction are formed at specified intervals in the tire circumferential direction in the land portions on both shoulder sides. In this case, the sipes may include multiple types with different groove widths, the sipes of different groove widths being alternately arranged in the tire circumferential direction. Furthermore, it is preferable to form linear, narrow grooves that are in communication with the sipes in the ground contact region of the land portions on both shoulder sides.

EFFECT OF THE INVENTION

In the present invention, the lug grooves are not formed in the ground contact region of the land portions on both shoulder sides among the multiplicity of land portions formed on the tread surface. Therefore, it is possible to improve steering stability performance on dry road surfaces since the rigidity of these land portions is assured. Guaranteeing the rigidity of these land portions simultaneously makes improvement in noise performance possible since popping sounds and pattern noise when driving are suppressed.

Also, since lug grooves inclining in the tire circumferential direction that have terminating parts in the land portions and opening to the main grooves on the vehicle inner side are formed at specified intervals in the tire circumferential direction in the land portions adjacent to an inner side of the land portions on both shoulder sides, and a length of the lug grooves extending in the tire width direction is 40 to 60% of the width of the land portions in which the lug grooves are formed, and an inclination angle on the acute angle side of the lug grooves with respect to the tire circumferential direction for the land portions on a vehicle outer side is equal to or less than that of the land portions on the vehicle inner side, so rainwater between the land portions and the road surface effectively flows freely towards the main grooves on the vehicle inner side when driving on wet road surfaces. Thus, steering stability performance on wet road surfaces can be improved. Moreover, since popping sounds and pattern noise when driving are also suppressed, noise performance can be improved.

BEST MODE FOR CARRYING OUT THE INVENTION

Detailed descriptions will be given below of a configuration of the present invention with reference to the accompanying drawings.

Figure 1:
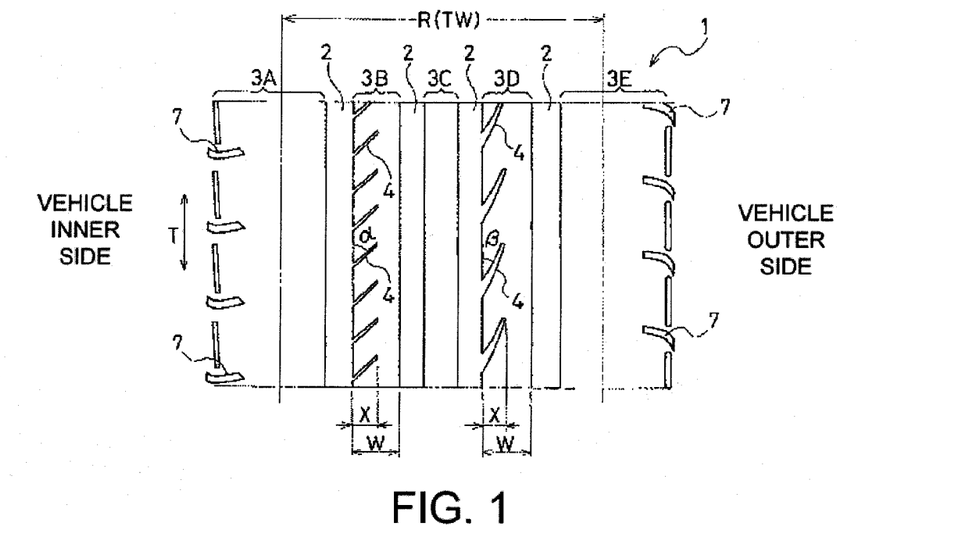
FIG. 1 is a plan view showing a part of a tread surface of a pneumatic tire according to an embodiment of the present invention.
Figure 2:
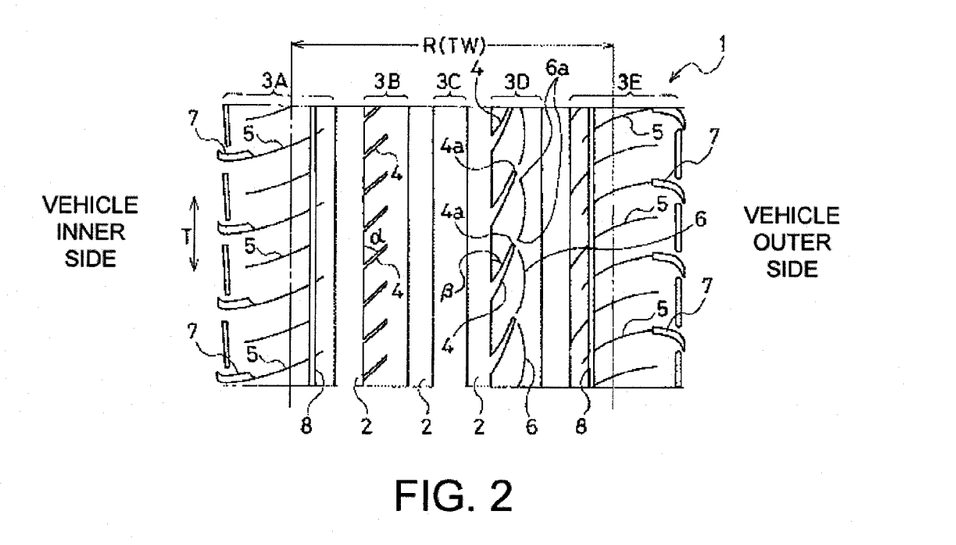
FIG. 2 is a plan view corresponding to FIG. 1 according to another embodiment of the present invention.

FIG. 1 is a plan view showing a part of a tread surface of a pneumatic tire according to the present embodiment. FIG. 2 is a plan view corresponding to FIG. 1 according to another embodiment of the present invention.

In FIG. 1, the pneumatic tire according to the present embodiment has a plurality (four grooves in the drawing) of main grooves 2 extending linearly in a tire circumferential direction T provided on a tread surface 1 and a multiplicity of land portions 3A, 3B, 3C, 3D, and 3E formed by these main grooves 2 partitioning the tread surface 1. Additionally, a mounting direction on a vehicle is designated.

Figure 7:
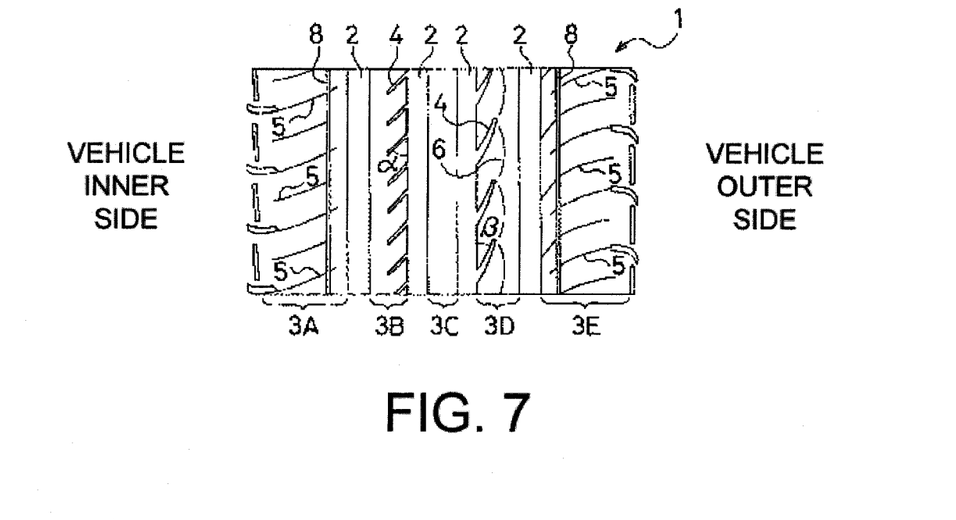
FIG. 7 is a plan view showing the tread surface of the tire of Comparative Example 5 used in the embodiments.

Also, in the present invention, among the land portions 3A, 3B, 3C, 3D, and 3E, lug grooves are not provided in a ground contact region R of the land portions 3A and 3E positioned on both shoulder sides. Lug grooves 4 inclining in the tire circumferential direction that have terminating parts in the land portions and opening to the main grooves 2, 2 on a vehicle inner side partitioning the tread surface into the land portions 3B and 3D are formed at specified intervals in the tire circumferential direction T in the land portions 3B and 3D adjacent to inner sides of the land portions 3A and 3E on both shoulder sides. FIG. 7 shows shoulder lug grooves formed in end sections on both shoulder sides.

Rigidity of the land portions 3A and 3E on both shoulder sides is guaranteed by not forming lug grooves 4 in the ground contact region R of the land portions 3A and 3E on both shoulder sides. It is thus possible to improve steering stability performance on dry road surfaces and simultaneously suppress popping sounds and pattern noise when driving. Suppressing popping sounds and pattern noise when driving makes improvement in noise performance possible.

Also, when driving on wet roads, rainwater between the land portions 3B and 3D and the road surface effectively flows freely towards the main grooves 2 on the vehicle inner side because the lug grooves 4 that incline in the tire circumferential direction that have the terminating parts in the land portions and open to the main grooves 2 on the vehicle inner side are formed at specified intervals in the tire circumferential direction in the land portions 3B and 3D adjacent to the inner sides of the land portions 3A and 3E on both shoulder sides. It is thus possible to improve steering stability performance on wet road surfaces and also suppress popping sounds and pattern noise when driving. Suppressing popping sounds and pattern noise when driving makes further improvement in noise performance possible.

In the present invention, "ground contact region R" means the region in a tire width direction corresponding to a maximum linear distance (tire ground contact width TW) in the tire width direction of a ground contact surface formed on a flat plate when, after the tire is filled to an air pressure corresponding to a maximum load capacity defined by JATMA (Japan Automobile Tyre Manufacturers Association Inc.) and placed perpendicularly on the flat plate in a motionless state, a load corresponding to 80% of the maximum load capacity is placed thereon.

Also, "main grooves 2" of the present invention are grooves with a groove width of 5 mm or more. In pneumatic tires for passenger vehicles, the groove width is usually set to a constant width within a range of about 6 to 15 mm. Furthermore, the groove width of the lug grooves 4 does not have to be constant. The lug grooves 4 may be grooves with a groove width exceeding 1.5 mm and are usually arbitrarily set within a range of about 1.6 to 5 mm.

The embodiment of FIG. 1 shows a case where five land portions 3A, 3B, 3C, 3D, and 3E are formed in the tread surface 1. However, the number of land portions is not limited thereto. Four, six, or more land portions may be formed depending on the type and size of the tire.

Also, the embodiment of FIG. 1 shows a case where the lug grooves 4 are not formed in the land portion 3C positioned in a center section of the tire from the perspective of guaranteeing straight traveling performance when driving at high speeds. However, there are cases where the lug grooves 4 extending at an angle from the inner side of the land portions 3C in the tire width direction and opening to the main groove 2 on the vehicle inner side are also formed in the land portion 3C depending on the performance required of the tire. When six or more land portions are formed in the tread surface 1, excluding the land portions on both shoulder sides, lug grooves 4 that open to the main groove 2 on the vehicle inner side may be formed in all of the land portions.

In the pneumatic tire of the present invention, a length x of the lug grooves 4 extending in the tire width direction is set to 40 to 60%, and preferably to 45 to 55%, of a width W of the land portions 3B and 3D in which the lug grooves 4 are formed. A high level of performance in both steering stability on dry road surfaces and steering stability on wet road surfaces can be achieved thereby. Steering stability performance on wet road surfaces is insufficient when the length x is less than 40% of the width W and steering stability performance on dry road surfaces is insufficient when the length x exceeds 60% of the width W.

Furthermore, in the present invention, inclination angles α and β on an acute angle side of the lug grooves 4 with respect to the tire circumferential direction T in the land portion 3D on the vehicle outer side are less than or equal to inclination angles in the land portion 3B on the vehicle inner side ($\alpha \geq \beta$). Steering stability performance on dry road surfaces can be assuredly improved thereby. In the present embodiment, the inclination angle α may be set to 45 to 80° and the inclination angle β may be set to 25 to 70°.

In the present embodiment, the width W of the land portion 3D on the vehicle outer side is larger than the width W in the land portion 3B on the vehicle inner side. Steering stability on dry road surfaces can be further assuredly guaranteed thereby.

FIG. 2 is a plan view corresponding to FIG. 1 according to another embodiment of the present invention. In the present embodiment, among the land portions 3A, 3B, 3C, 3D, and 3E, sipes 5 extending from shoulder lug grooves 7 in the tire width direction are formed at specified intervals in the tire circumferential direction in the land portions 3A and 3E on both shoulder sides. In the present embodiment, a groove width of the sipes 5 may be set to 0.1 to 1.5 mm. Drainage can thereby be further improved while effectively suppressing popping sounds and pattern noise when driving.

The present embodiment shows a case where the sipes 5 extend to the left and right straddling the ground contact region R, end parts of all of the sipes 5 in the shoulder land portion 3A terminate in the shoulder land portion 3A, and end parts of the sipes 5 in the shoulder portion 3E are alternately in communication with the main groove 2 in the tire width direction T. However, the position of the sipes 5 in the tire width direction is not limited thereto and they may be arranged so as to extend over the whole length of the land portions 3A and 3E of both shoulder sides.

Furthermore, in the embodiment of FIG. 2, curved sipes 6 are formed between the lug grooves 4, 4 in the land portion 3D on the vehicle outer side in the ground contact region R. Braking performance and turning performance on wet roads can thereby be improved while improving noise performance. In this case, a distance between a terminating part 4a of the lug grooves 4 and terminating parts 6a, 6a of the curved sipes 6 is set to about 0.3 to 2.0 mm.

In the present embodiment, a case where the curved sipes 6 are formed as an arc-shaped smooth line projecting to the vehicle outer side is shown. However, the planar form of the curved sipes 6 is not limited thereto and an arc-shaped wavy or zigzag line can be formed.

In the embodiment of FIG. 2, the sipes 5 formed in the land portions 3A and 3E on both shoulder sides preferably include multiple types having different groove widths, and these sipes with differing groove widths are positioned alternatingly with respect to the circumferential direction T. Since the rigidity of the land portions 3A and 3E sandwiched between the sipes 5, 5 differs as a result, the generation of pattern noise can be further effectively suppressed, thus making improvement in noise performance possible.

In the aforementioned case, the sipes 5 formed in the land portions 3A and 3E on both shoulder sides may be two types of sipes having different groove widths, with the sipes that have a wider width being in communication with the shoulder lug grooves 7. Drainage can be further improved thereby.

More preferably, narrow grooves 8 that are in communication with the aforementioned sipes 5 and that extend linearly in the tire circumferential direction T are formed in the ground contact region R of the land portions 3A and 3E on both shoulder sides. In the present embodiment, a groove width of the narrow grooves may be set to about 1.0 to 3.0 mm. Rigidity of the land portions 3A and 3E on both shoulder sides formed by the partitioning of the tread surface by the narrow grooves 8 and the main grooves 2 is assuredly guaranteed thereby, thus making improvement in straight traveling performance when driving at high speeds possible.

As mentioned above, the pneumatic tire of the present invention improves noise performance while achieving a high level of both steering stability performance on dry road surfaces and steering stability performance on wet road surfaces by including: a plurality of main grooves that are provided on the tread surface and that extend linearly in the tire circumferential direction; and a multiplicity of land portions formed by the main grooves partitioning the tread surface, and having a designated mounting direction on a vehicle, wherein, among the multiplicity of land portions, lug grooves are not provided in the land portions positioned on both shoulder sides, and lug grooves inclining in the tire circumferential direction that have terminating parts in the land portions and opening to the main grooves on a vehicle inner side are formed at specified intervals in the tire circumferential direction in the land portions adjacent to an inner side of the land portions on both shoulder sides, and the length of the lug grooves extending in the tire width direction is 40 to 60% of the width of the land portions in which the lug grooves are formed and an inclination angle on the acute angle side of the lug grooves with respect to the tire circumferential direction for the land portions on the vehicle outer side is equal to or less than that of the land portions on the vehicle inner side. As a result the pneumatic tire of the present invention can be widely applied as a pneumatic tire mounted on high performance vehicles driving on road surfaces maintained in recent years.

EXAMPLES

Examples 1 to 3 and Comparative Examples 1 to 3

Figure 3:
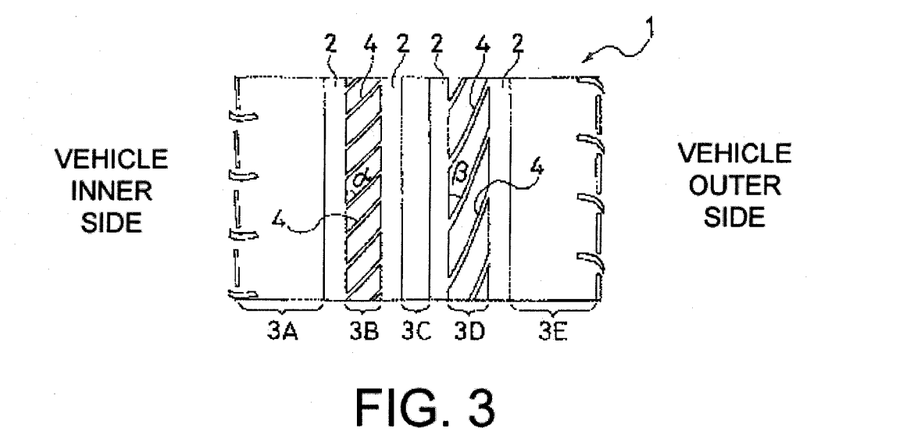
FIG. 3 is a plan view showing the tread surface of the tire of Comparative Example 1 used in the embodiments.
Figure 4:
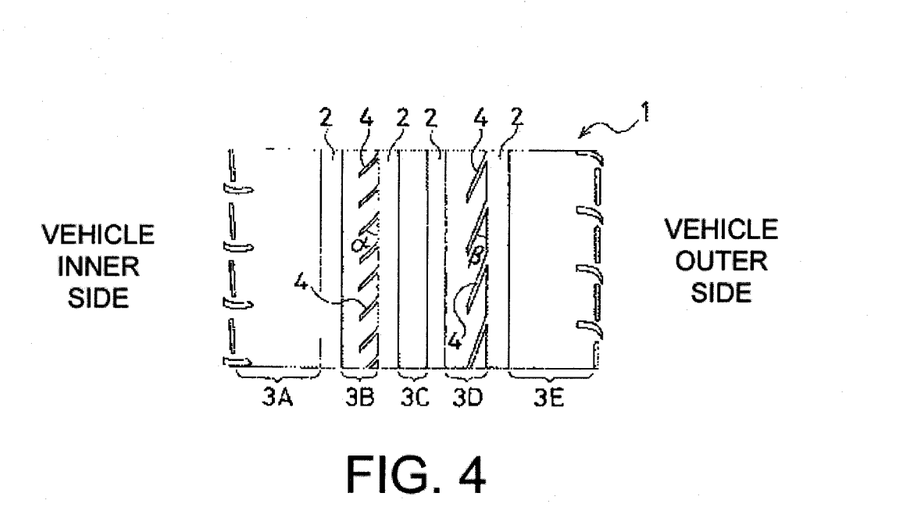
FIG. 4 is a plan view showing the tread surface of the tire of Comparative Example 2 used in the embodiments.
Figure 5:
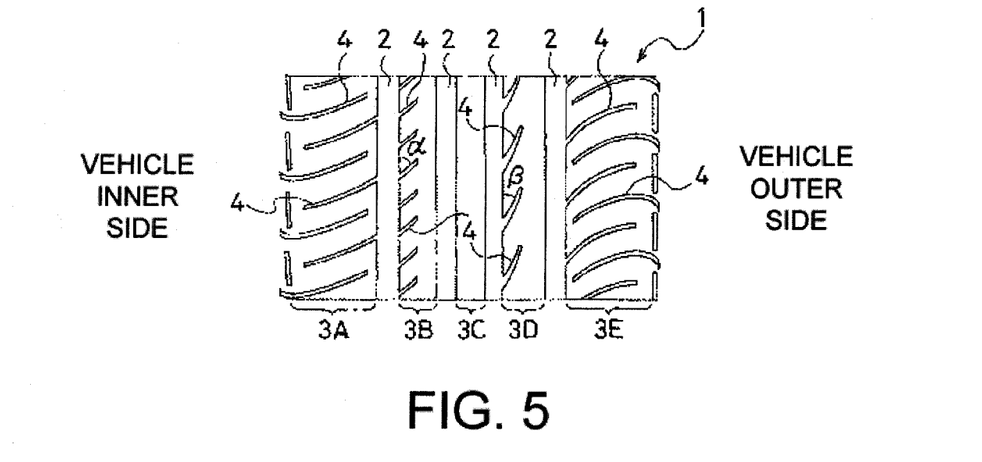
FIG. 5 is a plan view showing the tread surface of the tire of Comparative Example 3 used in the embodiments.

Using a 215/55R17 94W size tire and FIG. 1 as the basic form of the tread pattern, present invention tires (Examples 1 to 3) having the pattern configuration shown in FIG. 1; a comparative tire (Comparative Example 1) having the lug grooves 4 formed in the land portions 3B and 3D in the tire of FIG. 1 open to the main grooves 2, 2 on both sides as shown in FIG. 3; a comparative tire (Comparative Example 2) having the lug grooves 4 formed in the land portions 3B and 3D in the tire of FIG. 1 open to the main groove 2 on the vehicle outer side as shown in FIG. 4; and a comparative tire (Comparative Example 3) having the lug grooves 4 formed in the land portions 3A and 3E on both shoulder sides in the tire of FIG. 1 as shown in FIG. 5 were prepared.

Groove area ratios of the lug grooves 4 formed in the land portions 3B and 3D were set the same for each tire. In the present invention tires, and in the comparative tires used in Comparative Examples 2 and 3, the length x of the lug grooves 4 extending in the tire width direction was set to 50% of the width W of the land portions 3B and 3D. Also, the groove width of the lug grooves 4 formed in the land portions 3A and 3E on both shoulder sides of the comparative tires used in Comparative Example 3 was set to 3 mm.

Steering stability on dry road surfaces (hereinafter referred to as "dry performance"), steering stability on wet road surfaces (hereinafter referred to as wet performance"), and noise performance were evaluated using the test methods below for these six types of tires. The results thereof are disclosed in Table 1, with Comparative Example 1 as the standard. Larger numerical values indicate superior performance.

Dry Performance

After fitting each of the tires onto a rim (17×7 J) and inflating to a filled air pressure of 230 kPa, such was fitted to front and back wheels of a vehicle (engine displacement: 3,200 cc). Three experienced test drivers then performed sensory evaluation by driving on a test course consisting of a dry asphalt road surface while varying driving speed within a range from 0 to 200 km/h. The results thereof are shown by a 5-point method with Comparative Example 1 as 3. With respect to "+" and "−" after numerical values, "+" indicates marginally superiority to the numerical value and "−" indicates marginal inferiority to the numerical value.

Wet Performance

After fitting each of the tires onto a rim (17×7 J) and inflating to a filled air pressure of 230 kPa, such was fitted to the front and back wheels of a vehicle (engine displacement: 3,200 cc). Three experienced test drivers then performed sensory evaluation by driving on a test course consisting of an asphalt road surface with a water depth of from 2 to 3 mm while varying driving speed within a range from 0 to 200 km/h. The results thereof are shown by a 5-point method with Comparative Example 1 as 3. With respect to "+" and "−" after numerical values, similar to the aforementioned evaluation results of dry performance, "+" indicates marginally superiority to the numerical value and "−" indicates marginal inferiority to the numerical value.

Noise Performance

After fitting each of the tires onto a rim (17×7 J) and inflating to a filled air pressure of 230 kPa, such was fitted to front and back wheels of a vehicle (engine displacement: 3,200 cc). While driving at an average speed of 60 km/h on a test course consisting of an asphalt road surface, sound pressure levels in a range of 0 to 200 Hz were measured by a microphone provided on the driver's side window. Evaluation of noise performance was performed using the results thereof. Noise performance is disclosed in Table 1 as indices with Comparative Example 1 as 100.

TABLE 1

| Tread Pattern | | Comparative Example 1 FIG. 3 | Example 1 FIG. 1 | Example 2 FIG. 1 | Example 3 FIG. 1 | Comparative Example 2 FIG. 4 | Comparative Example 3 FIG. 5 |
|---|---|---|---|---|---|---|---|
| Width of Land Portion in Ground Contact Region (cm) | 3B | 25 | 25 | 25 | 20 | 25 | 25 |
| | 3D | 25 | 25 | 25 | 30 | 25 | 25 |
| Lug groove inclination angle (°) | α | 45 | 45 | 60 | 60 | 45 | 45 |
| | β | 45 | 45 | 30 | 30 | 45 | 45 |
| Evaluation | Dry performance (5-point method) | 3 | 4 | 4+ | 5 | 3 | 2 |
| | Wet performance (5-point method) | 3 | 4 | 4+ | 5 | 2 | 4+ |
| | Noise performance (index) | 100 | 105 | 105 | 105 | 102 | 94 |

It is evident from Table 1 that, compared to the comparative tires, the present invention tires achieve both steering stability on dry road surfaces and steering stability on wet road surfaces in good balance while simultaneously improving noise performance involving pattern noise.

Examples 4 to 7 and Comparative Examples 4 to 6

Figure 6:
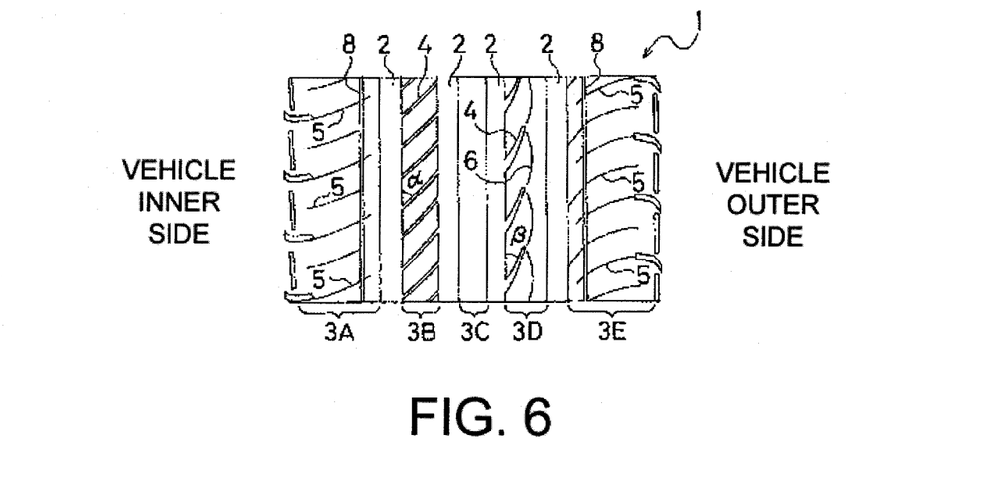
FIG. 6 is a plan view showing the tread surface of the tire of Comparative Example 4 used in the embodiments.
Figure 8:
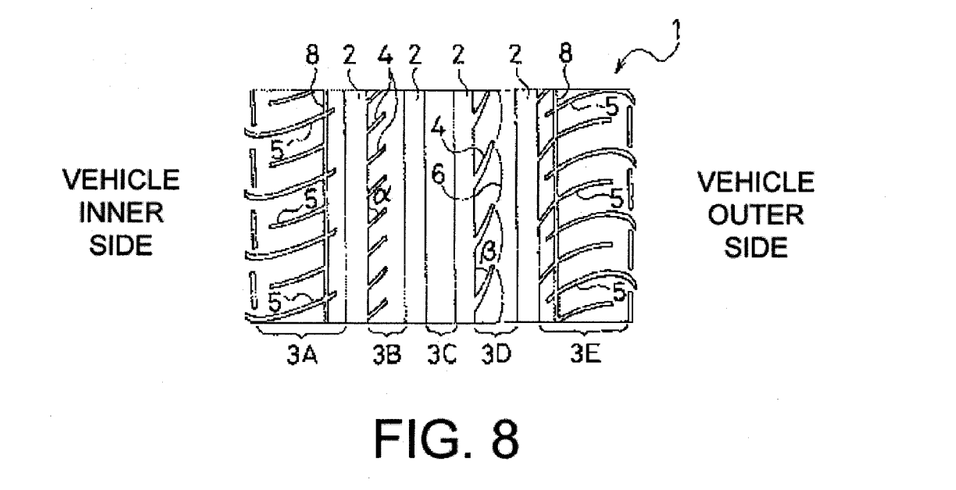
FIG. 8 is a plan view showing the tread surface of the tire of Comparative Example 6 used in the embodiments.

Using a 215/55R17 94W size tire and FIG. 2 as the basic form of the tread pattern, present invention tires (Examples 4 to 7) having the pattern configuration shown in FIG. 2; a comparative tire (Comparative Example 4) having the lug grooves 4 formed in the land portion 3B in the tire of FIG. 2 open to the main grooves 2, 2 on both sides as shown in FIG. 6; a comparative tire (Comparative Example 5) having the lug grooves 4 formed in the land portion 3B in the tire of FIG. 2 open to the main groove 2 on the vehicle outer side as shown in FIG. 7; and a comparative tire (Comparative Example 6) having the lug grooves 4 (groove width: 3 mm) instead of sipes 6 formed in the land portions 3A and 3E on both shoulder sides in the tire of FIG. 2 as shown in FIG. 8 were prepared.

Groove area ratios of the lug grooves 4 formed in the land portion 3B were set the same for each tire. In the present invention tires, and in the comparative tires used in Comparative Examples 5 and 6, the length x of the lug grooves 4 extending in the tire width direction was set to 50% of the width W of the land portion 3B. Also, the groove width of the sipes 5 formed in the land portions 3A and 3E on both shoulder sides of the present invention tires used in Examples 4 to 6 and the comparative tires used in Comparative Examples 4 and 5 was set to 0.7 mm. The sipes 5 formed in the land portions 3A and 3E on both shoulder sides of the present invention tires used in Example 7 were two types with different groove widths (1.0 mm and 0.5 mm) and these two types of sipes 5 were arranged alternately in the tire circumferential direction.

Dry performance, wet performance, and noise performance were evaluated for these seven types of tires using the same aforementioned test methods. The results thereof are disclosed in Table 2 with Comparative Example 4 as the standard. Larger numerical values indicate superior performance.

TABLE 2

| | | CE 4 | Ex 4 | Ex 5 | Ex 6 | Ex 7 | CE 5 | CE 6 |
|---|---|---|---|---|---|---|---|---|
| Tread Pattern | | FIG. 6 | FIG. 2 | FIG. 2 | FIG. 2 | FIG. 2 | FIG. 7 | FIG. 8 |
| Form of Grooves in Tire Width Direction Formed in Land Portions on Both Shoulder Sides | | Sipes of same width | Sipes of same width | Sipes of same width | Sipes of same width | Sipes of different widths | Sipes of same width | Lug grooves of same width |
| Width of Land Portion in Ground Contact Region (cm) | 3B | 25 | 25 | 25 | 20 | 25 | 25 | 25 |
| | 3D | 25 | 25 | 25 | 30 | 25 | 25 | 25 |
| Lug groove inclination angle (°) | α | 45 | 45 | 60 | 60 | 45 | 45 | 45 |
| | β | 45 | 45 | 30 | 30 | 45 | 45 | 45 |

TABLE 2-continued

|  |  | CE 4 | Ex 4 | Ex 5 | Ex 6 | Ex 7 | CE 5 | CE 6 |
|---|---|---|---|---|---|---|---|---|
|  |  | \multicolumn{7}{c}{Tread Pattern} |
|  |  | FIG. 6 | FIG. 2 | FIG. 2 | FIG. 2 | FIG. 2 | FIG. 7 | FIG. 8 |
|  |  | \multicolumn{7}{c}{Form of Grooves in Tire Width Direction Formed in Land Portions on Both Shoulder Sides} |
|  |  | Sipes of same width | Sipes of same width | Sipes of same width | Sipes of same width | Sipes of different widths | Sipes of same width | Lug grooves of same width |
| Evaluation | Dry Performance (5-point method) | 3 | 3+ | 4 | 4+ | 4− | 3 | 2 |
|  | Wet performance (5-point method) | 3 | 3+ | 4 | 4+ | 4− | 2+ | 4+ |
|  | Noise performance (index) | 100 | 103 | 103 | 103 | 105 | 101 | 95 |

Notes to Table 2:
As used in the table, "CE" is an abbreviation for "Comparative Example", and "Ex" is an abbreviation for "Example".

It is evident from Table 2 that, compared to the comparative tires, the present invention tires achieve both steering stability on dry road surfaces and steering stability on wet road surfaces in good balance while simultaneously improving noise performance involving pattern noise.

What is claimed is:

1. A pneumatic tire having a designated mounting direction on a vehicle comprising: a plurality of main grooves provided on a tread surface extending linearly in a tire circumferential direction; and a multiplicity of land portions formed by the main grooves partitioning the tread surface, wherein,
among the multiplicity of land portions,
lug grooves are not provided in a ground contact region of the land portions positioned on both shoulder sides,
lug grooves inclining in the tire circumferential direction that have terminating parts in the land portions and opening to the main grooves on a vehicle inner side partitioning the tread surface into the land portions are formed at specified intervals in the tire circumferential direction in land portions adjacent to an inner side of the land portions on both shoulder sides, the lug grooves being open only to the vehicle inner side,
and a length of the lug grooves extending in the tire width direction is 40 to 60% of a width of the land portions in which the lug grooves are formed and an inclination angle on an acute angle side of the lug grooves with respect to the tire circumferential direction for the land portions on the vehicle outer side is equal to or less than that of the land portions on the vehicle inner side.

2. The pneumatic tire according to claim 1, wherein the width of the land portions in which the lug grooves are formed is larger in the land portions on the vehicle outer side than in the land portions on the vehicle inner side.

3. The pneumatic tire according to claim 1, wherein sipes extending in the tire width direction are formed at specified intervals in the tire circumferential direction in each of the land portions on both shoulder sides.

4. The pneumatic tire according to claim 3, wherein the sipes comprise multiple types having different groove widths, the sipes having different groove widths being arranged alternately in the tire circumferential direction.

5. The pneumatic tire according to claim 3, wherein narrow grooves communicating with the sipes and extending linearly in the tire circumferential direction are formed in the ground contact region of the land portions on both the shoulder sides.

6. The pneumatic tire according to claim 2, wherein sipes extending in the tire width direction are formed at specified intervals in the tire circumferential direction in each of the land portions on both shoulder sides.

7. The pneumatic tire according to claim 6, wherein the sipes comprise multiple types having different groove widths, the sipes having different groove widths being arranged alternately in the tire circumferential direction.

8. The pneumatic tire according to claim 7, wherein narrow grooves communicating with the sipes and extending linearly in the tire circumferential direction are formed in the ground contact region of the land portions on both the shoulder sides.

9. The pneumatic tire according to claim 4, wherein narrow grooves communicating with the sipes and extending linearly in the tire circumferential direction are formed in the ground contact region of the land portions on both the shoulder sides.

10. The pneumatic tire according to claim 1, wherein the main grooves comprise a width of 5 mm or more.

11. The pneumatic tire according to claim 10, wherein the main grooves comprise a width of from about 6 to 15 mm.

12. The pneumatic tire according to claim 1, wherein the lug grooves comprise a groove width greater than 1.5 mm.

13. The pneumatic tire according to claim 12, wherein the lug grooves comprise a groove width within a range of about 1.6 to 5 mm.

14. The pneumatic tire according to claim 1, wherein the length of the lug grooves extending in the tire width direction is 45 to 55% of a width of the land portions in which the lug grooves are formed.

15. The pneumatic tire according to claim 1, wherein, of the land portions adjacent to the inner side of the land portions on both shoulder sides, the inclination angle of the lug grooves formed in the land portion arranged to the vehicle inner side is $\alpha$ and the inclination angle of the lug grooves formed in the land portion arranged to the vehicle outer side is $\beta$, where $\alpha \geq \beta$, $\alpha$ is set between 45 and 80°, and $\beta$ is set between 25 and 70°.

16. The pneumatic tire according to claim 3, wherein a groove width of the sipes is set between 0.1 and 1.5 mm.

17. The pneumatic tire according to claim 1, wherein curved sipes are formed between the lug grooves in the land portion on the vehicle outer side in the ground contact region.

18. The pneumatic tire according to claim 17, wherein a distance between a terminating part of the lug grooves and terminating parts of the curved sipes is set from about 0.3 to 2.0 mm.

19. The pneumatic tire according to claim 3, further comprising narrow grooves formed in the ground contact region of the land portions on both shoulder sides and in communication with the sipes, the narrow grooves extending linearly in the tire circumferential direction.

20. The pneumatic tire according to claim 19, wherein the narrow grooves comprise a narrow groove width of between 1.0 and 3.0 mm.

* * * * *